(12) United States Patent
Li (10) Patent No.: US 11,165,950 B2
(45) Date of Patent: Nov. 2, 2021

(54) METHOD AND APPARATUS FOR SHOOTING VIDEO, AND STORAGE MEDIUM

(71) Applicant: Beijing Dajia Internet Information Technology Co., Ltd., Beijing (CN)

(72) Inventor: Qian Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/030,697

(22) Filed: Sep. 24, 2020

(65) Prior Publication Data
US 2021/0152729 A1    May 20, 2021

(30) Foreign Application Priority Data

Nov. 15, 2019   (CN) .......................... 201911121794.6

(51) Int. Cl.
*H04N 5/222* (2006.01)
*H04N 5/232* (2006.01)
*H04N 5/262* (2006.01)

(52) U.S. Cl.
CPC ..... *H04N 5/23216* (2013.01); *H04N 5/23229* (2013.01); *H04N 5/23245* (2013.01); *H04N 5/232933* (2018.08); *H04N 5/2621* (2013.01)

(58) Field of Classification Search
CPC .......... H04N 5/23216; H04N 5/23229; H04N 5/23245; H04N 5/232933; H04N 5/2621; H04N 1/00408; H04N 1/00411; H04N 1/00413; H04N 1/0044

See application file for complete search history.

(56) References Cited

U.S. PATENT DOCUMENTS

| | | | | |
|---|---|---|---|---|
| 2017/0244879 | A1* | 8/2017 | Bezjian | H04N 5/2258 |
| 2018/0122419 | A1* | 5/2018 | Wayans | G11B 27/34 |
| 2018/0160031 | A1* | 6/2018 | Hoshino | H04N 5/772 |
| 2021/0006710 | A1* | 1/2021 | Li | H04N 5/232933 |

FOREIGN PATENT DOCUMENTS

| | | | |
|---|---|---|---|
| CN | 102801942 | A | 11/2012 |
| CN | 105141869 | A | 12/2015 |
| CN | 106131432 | * | 11/2016 |
| CN | 106131432 | A | 11/2016 |
| CN | 108616696 | A | 10/2018 |
| CN | 108833787 | A | 11/2018 |
| CN | 108965705 | A | 12/2018 |
| CN | 108989691 | A | 12/2018 |
| CN | 110225278 | A | 9/2019 |

OTHER PUBLICATIONS

OA1 for CN application 201711121794.6.
English translation of OA1 for CN application 201711121794.6.

* cited by examiner

Primary Examiner — Kelly L Jerabek
(74) Attorney, Agent, or Firm — Timothy W. Menasco, Esq.; Harter Secrest & Emery LLP (57) ABSTRACT

The present disclosure relates to a method and apparatus for shooting a video, and a storage medium. In the present disclosure, a shooting preview interface which includes a plurality of duration tags corresponding to different shooting durations is displayed on a screen of an electronic device. The electronic device may shoot the video with a maximum duration based on a first duration tag selected from the plurality of duration tags. The maximum duration is updated based on a second duration tag in response to that a selected duration tag is changed to the second duration tag.

14 Claims, 5 Drawing Sheets

METHOD AND APPARATUS FOR SHOOTING VIDEO, AND STORAGE MEDIUM

CROSS-REFERENCE TO RELATED APPLICATION

The present application is based on and claim priority under 35 U.S.C. 119 to Chinese Patent Application No. 201911121794.6, filed with the China National Intellectual Property Administration on Nov. 15, 2019, the disclosures of which are herein incorporated by reference in its entirety.

FIELD

The present disclosure relates to a field of communication technologies, and more particularly, to method and apparatus for shooting a video, and a non-transitory computer-readable storage medium.

BACKGROUND

Currently, in shooting scenes of short videos, there are different shooting duration modes, such as 10 seconds, 15 seconds, 30 seconds, and so on. When shooting a short video, a user can first select a shooting duration mode from these shooting duration modes, and then perform a shooting operation in the selected shooting duration mode.

SUMMARY

The present disclosure provides a method and apparatus for shooting a video, and a non-transitory computer-readable storage medium. The technical solutions of the present disclosure are as follows.

Embodiments of the present disclosure provide a method for shooting a video. The method may include: displaying a shooting preview interface, in which the shooting preview interface may include a plurality of duration tags corresponding to different shooting durations; shooting the video with a maximum duration based on a first duration tag selected from the plurality of duration tags; and updating the maximum duration based on a second duration tag in response to that a selected duration tag is changed to the second duration tag.

Embodiments of the present disclosure provide an apparatus for shooting a video. The apparatus may include one or more processors; a memory coupled to the one or more processors, and a plurality of instructions stored in the memory. When the instructions are executed by the one or more processors, the one or more processors are caused to perform acts including: displaying a shooting preview interface, in which the shooting preview interface may include a plurality of duration tags corresponding to different shooting durations; shooting the video with a maximum duration based on a first duration tag selected from the plurality of duration tags; and updating the maximum duration based on a second duration tag in response to that a selected duration tag is changed to the second duration tag.

Embodiments of the present disclosure also provide a non-transitory computer-readable storage medium, in which when an instruction stored therein is executed by a processor in an electronic device, the processor is caused to perform acts including: displaying a shooting preview interface, in which the shooting preview interface may include a plurality of duration tags corresponding to different shooting durations; shooting the video with a maximum duration based on a first duration tag selected from the plurality of duration tags; and updating the maximum duration based on a second duration tag in response to that a selected duration tag is changed to the second duration tag.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, and do not constitute an improper limitation of the present disclosure.

DETAILED DESCRIPTION

In order to enable those skilled in the art to understand the technical solutions of the present disclosure, reference will be made clearly and completely technical solutions in the embodiments of the present disclosure with accompanying drawings.

It should be noted that terms "first" and "second" in the specification and claims of the present disclosure and the accompanying drawings are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following exemplary embodiments do not represent all implementations consistent with the present disclosure; instead, the implementations described in the following exemplary embodiments are merely examples of an apparatus and method consistent with the attached claims and some aspects of the present disclosure.

In related art, the electronic device can only shoot a video in the shooting duration mode selected by the user, that is, the electronic device can only shoot in a fixed shooting duration mode, causing a poor flexibility in video shooting for the electronic device.

Embodiments of the present disclosure provide a method for shooting a video and apparatus, an electronic device, and a storage medium. The technical solutions according to embodiments of the present disclosure at least bring the following beneficial effects. After a user performs a shooting operation, the electronic device may keep displaying at least one duration tag so that the user may select a duration tag (for example, the second duration tag) based on practical requirements, that is, after the electronic device starts to shoot a video, the user may still select the desired duration tag. Consequently, the electronic device updates a maximum duration of video shooting to a shooting duration corresponding to a duration tag selected by the user, that is, the electronic device may, based on selections of the duration tag of the user, perform video shooting of different durations, thereby improving the flexibility of the electronic device for video shooting.

In a scene of video shooting (or video recording), the user may enter a video shooting interface through a video shooting platform (or a video recording platform) for video shooting. Generally, the user may first select a desired shooting duration mode (for example, shoot for 10 seconds, shoot for 15 seconds, shoot for 30 seconds, etc.) in the video shooting interface, and then trigger the electronic device to perform the video shooting in the shooting duration mode.

Figure 1:
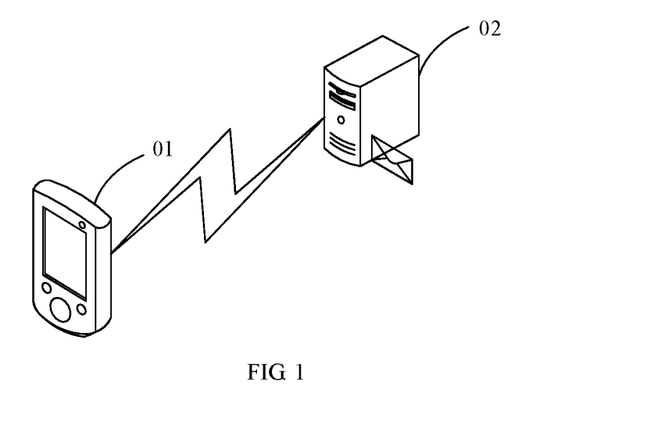
FIG. 1 is a schematic diagram of an implementation environment of a method for shooting a video according to an exemplary embodiment.

FIG. 1 is a schematic diagram of an implementation environment according to an exemplary embodiment. As illustrated in FIG. 1, the method for shooting a video may be applied to the implementation environment. The implementation environment includes an electronic device 01 and a server 02. The electronic device 01 and the server 02 may be interconnected and communicated via a network.

The electronic device 01 may be a device with a shooting (or recording) function and a display (or presenting) function. The electronic device 01 runs a video shooting platform. The video shooting platform may be an application (i.e., APP) with a shooting function. The electronic device 01 may obtain video data through shooting with the video shooting platform and send the video data to the server 02. The server 02 may receive and save the video data, so that other electronic devices may obtain the video data from the server 02 and thus a video shot by the electronic device 01 may be watched based on the video data.

The electronic device 01 may be any electronic product, such as a mobile phone, a tablet computer, a handheld computer, a personal computer (PC), a wearable device, a smart TV, etc., that may interact with the user through one or more media such as a keyboard, a touchpad, a touch screen, a remote control, voice interaction, a handwriting device and so on.

The server 02 may be a server, a server cluster composed of several servers, or a cloud computing service center. The server 02 may include a processor, a memory, and a network interface.

Those skilled in the art should understand that the above-mentioned electronic devices and servers are only examples, and other existing or future electronic devices or servers that are applicable to the present disclosure should also be included in the protection scope of the present disclosure, and are included here by reference.

Figure 2:
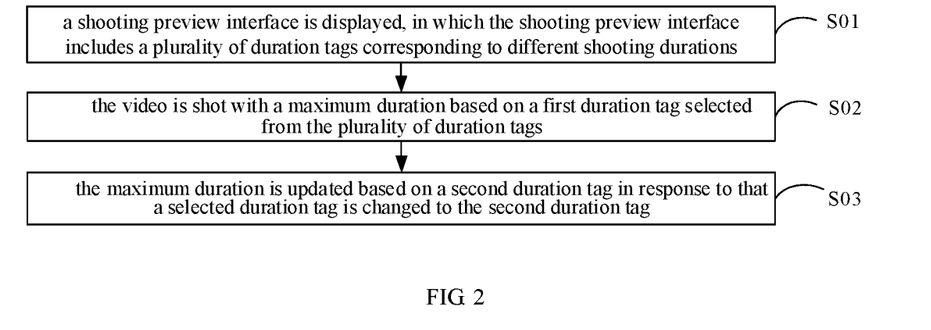
FIG. 2 is a flowchart of a method for shooting a video according to an exemplary embodiment.

FIG. 2 is a flowchart of a method for shooting a video according to an exemplary embodiment. FIG. 2 provides an overview of the solution of the present disclosure. As illustrated in FIG. 2, the method for shooting a video is applied to an electronic device and includes the following steps S01 to S03.

At step S01, a shooting preview interface is displayed, in which the shooting preview interface includes a plurality of duration tags corresponding to different shooting durations.

At step S02, the video is shot with a maximum duration based on a first duration tag selected from the plurality of duration tags.

At step S03, the maximum duration is updated based on a second duration tag in response to that a selected duration tag is changed to the second duration tag.

The method for shooting a video according to the present disclosure will be described in detail below.

Figure 3:
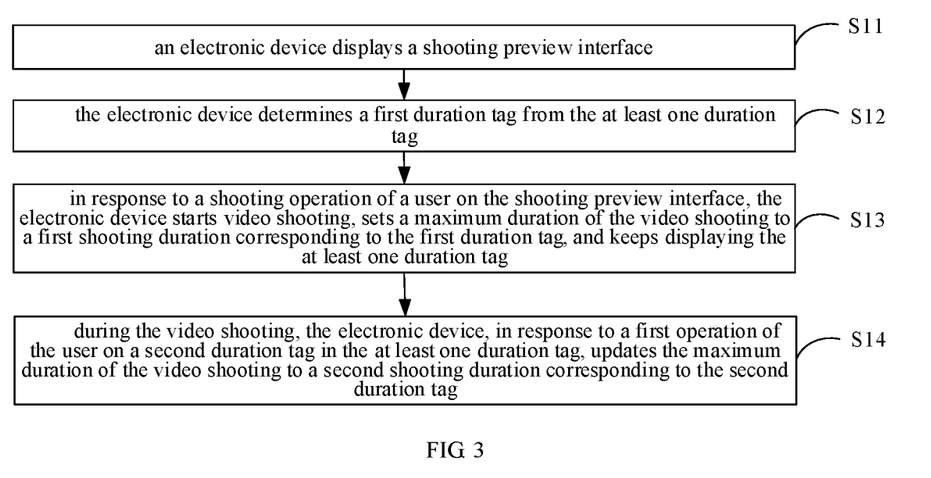
FIG. 3 is a flowchart of a method for shooting a video according to another exemplary embodiment.

FIG. 3 is a flowchart of a method for shooting a video according to an exemplary embodiment. As illustrated in FIG. 3, the method for shooting a video is applied to an electronic device and includes the following steps S11 to S14.

At step S11, an electronic device displays a shooting preview interface.

In an embodiment of the present disclosure, the above-mentioned shooting preview interface includes duration tags, and the respective duration tags correspond to different shooting durations.

It should be noted that each duration tag is used to indicate a shooting duration mode, and each shooting duration mode corresponds to a shooting duration. The electronic device may perform the video shooting in the shooting duration mode corresponding to each duration tag, that is, the electronic device may perform the video shooting within the shooting duration corresponding to each shooting duration mode.

Embodiments of the present disclosure may be applied to a scene where the user performs the video shooting (or video recording) through a video shooting platform (or a video recording platform).

In embodiments of the present disclosure, the user may click the icon representing the video shooting platform first, so that the electronic device displays the shooting preview interface of the video shooting platform, and then the user may perform a shooting operation in the shooting preview interface to trigger the electronic device to start the video shooting.

In embodiments of the present disclosure, the shooting preview interface may also include a shooting control. The shooting control may include two display states. In one display state, an operation (for example, the above shooting operation) of the user on the shooting control is used to trigger the start of shooting; and in the other display state, the operation (for example, the following second operation) of the user on the shooting control is used to trigger the termination of shooting.

In embodiments of the present disclosure, the above shooting operation may be a click operation (for example, a single-click operation) of the user on the shooting control; or, the above shooting operation may be a pressing operation of the user on a physical button or a combination of physical buttons of the electronic device. In detail, the shooting operation may be determined based on actual usage requirements, which is not limited herein.

At step S12, the electronic device determines a first duration tag from the duration tags.

In embodiments of the present disclosure, the electronic device may select a default duration tag from the duration tags in the shooting preview interface and determine the default duration tag as the first duration tag.

In embodiments of the present disclosure, the user may also perform an input (for example, a sliding operation or a click operation) on the at least one duration tag in the shooting preview interface to select one duration tag from the at least one duration tag, so that the electronic device determines the one duration tag as the first duration tag.

At step S13, in response to a shooting operation of a user on the shooting preview interface, the electronic device starts video shooting, sets a maximum duration of the video shooting to a first shooting duration corresponding to the first duration tag, and keeps displaying the at least one duration tag.

It is understandable that when the electronic device displays the shooting preview interface, the user may perform shooting operations on the shooting preview interface, so that the electronic device may start the video shooting, and set the maximum duration of the video shooting as the first shooting duration, that is, the electronic device is allowed to perform the video shooting within the first shooting duration.

In embodiments of the present disclosure, in response to the shooting operation, the electronic device may update the shooting preview interface to a different interface (for example, a first interface). The first interface includes at least one duration tag.

It may be understood that after the user performs the shooting operation, the at least one duration tag in the shooting preview interface may remain displayed (i.e., the duration tags do not disappear), that is, the at least one duration tag is still displayed in the first interface, so that the user may select the duration tag in the process of video shooting.

In embodiments of the present disclosure, a display form of the at least one duration tag in the shooting preview interface may be a floating display form. After the user performs the shooting operation, the electronic device may update other display contents in the shooting preview interface without updating the at least one duration tag displayed in a floating manner on the shooting preview interface, so that the at least one duration tag is kept displayed.

In embodiments of the present disclosure, after the user performs the shooting operation, the electronic device may draw a new interface. The new interface drawn includes at least one duration tag, so that the display of the at least one duration tag is maintained.

In embodiments of the present disclosure, in response to the shooting operation, the electronic device may start the video shooting in a shooting duration mode corresponding to the first duration tag (for example, the default duration tag or a duration tag selected by the user before the shooting operation) of the electronic device.

It is understandable that after the user performs the shooting operation, if it is detected that the user has not selected a duration tag (for example, a first operation described below) from the at least one duration tag that remains displayed, the electronic device may continue to perform the video shooting in the default shooting duration mode or the shooting duration mode selected by the user before the video shooting started.

Figure 4:
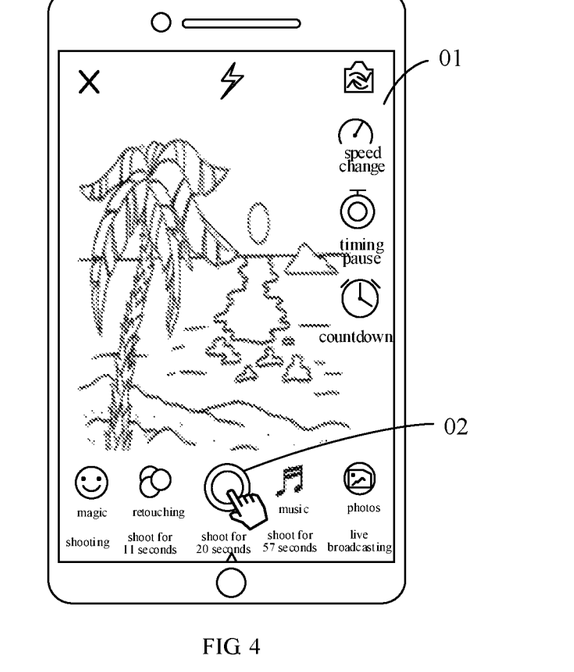
FIG. 4 is a schematic diagram of an interface of a mobile phone according to an exemplary embodiment.

Illustratively, the electronic device, as an example, is a mobile phone. As illustrated in FIG. 4, the mobile phone displays a shooting preview interface 01. The shooting preview interface 01 includes a shooting control 02 (a shooting control in a display state) and duration tags (for example, "shoot for 11 seconds", "shoot for 20 seconds" and "shoot for 57 seconds", etc.). The user may perform a shooting operation on the shooting control 02, so that the mobile phone may start the video shooting under the default duration tag (for example, "shoot for 20 seconds"). After shooting for 20 seconds, the mobile phone may terminate the video shooting, that is, the mobile phone finishes shooting a 20-second video.

In embodiments of the present disclosure, the electronic device may keep displaying the shooting control in response to the shooting operation, that is, the above first interface further includes the shooting control.

In embodiments of the present disclosure, after starting to shoot a video, the electronic device may display a shooting progress bar on the shooting control to prompt the user of a video shooting progress, that is, a time progress of a finished part of the video shooting.

In embodiments of the present disclosure, the electronic device may adopt a preset display manner (for example, color highlighting, font bolding, etc.) to display the shooting progress bar on the shooting control. In detail, the display manner may be set according to actual requirements, which is not limited herein.

Figure 5:
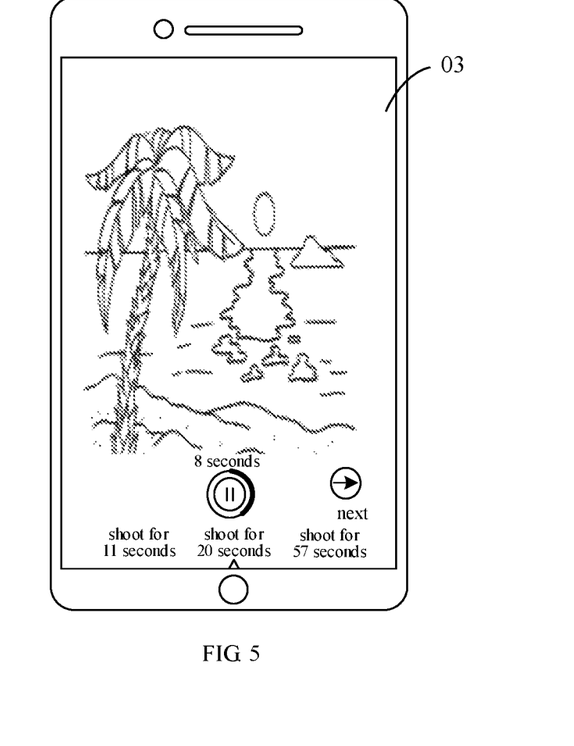
FIG. 5 is a schematic diagram of an interface of a mobile phone according to another exemplary embodiment.

Exemplarily, in combination with FIG. 4, as illustrated in FIG. 5, after the user performs the shooting operation on the shooting control 02, the mobile phone may start the video shooting under the default duration tag (for example, "shoot for 20 seconds"), and display a first interface 03. The first interface 03 includes duration tags (for example, "shoot for 11 seconds", "shoot for 20 seconds" and "shoot for 57 seconds", etc.) and the shooting control 02 (a shooting control in another display state). The shooting control 02 includes the shooting progress bar (illustrated by black filling in FIG. 4) to prompt the user of the video shooting progress, that is, the time progress (for example, 8 seconds) of the finished part of the video shooting.

At step S14, during the video shooting, the electronic device, in response to a first operation of the user on a second duration tag in the at least one duration tag, updates the maximum duration of the video shooting to a second shooting duration corresponding to the second duration tag.

In embodiments of the present disclosure, the user may operate a certain duration tag (for example, the second duration tag) in the duration tags to trigger the electronic device to reset the maximum duration (that is, the second shooting duration corresponding to the second duration tag) of the video shooting, and thus the electronic device may perform the video shooting within the second shooting duration corresponding to the second duration tag.

It may be understood that the electronic device may perform the video shooting in the shooting duration mode (for example, the target shooting duration mode, and the target shooting duration mode corresponds to the second shooting duration) indicated by the second duration tag.

In embodiments of the present disclosure, the above-mentioned first operation may be configured to trigger the electronic device to switch the duration tag displayed in the process of video shooting from the currently adopted first duration tag (for example, the default duration tag or the duration tag selected by the user before the shooting operation) to the second duration tag.

In embodiments of the present disclosure, the first operation may be a selection operation (for example, a click operation) on the second duration tag performed by the user; or, the first operation may be a sliding operation (for example, a sliding operation on the at least one duration tag) on the current interface (for example, an area where the at least one duration tag is displayed in the current interface) performed by the user against the second duration tag.

In embodiments of the present disclosure, the shooting preview interface includes the shooting progress bar configured to indicate the time progress of the video shooting.

After step S14, the method for shooting a video according to embodiments of the present disclosure further includes the following step S15.

At step S15, the electronic device adjusts a size of the shooting progress bar based on a proportional relationship between the second shooting duration and the first shooting duration.

In embodiments of the present disclosure, if the second shooting duration is longer than the first shooting duration, the electronic device may shorten the length of the shooting progress bar; or, if the second shooting duration is shorter than the first shooting duration, the electronic device may lengthen the length of the shooting progress bar.

It may be understood that the electronic device may determine a length to be adjusted (for example, a length to be shortened or a length to be lengthened) of the shooting progress bar based on the proportional relationship between the second shooting duration and the first shooting duration, and adjust the shooting progress bar based on the length to be adjusted.

In embodiments of the present disclosure, the electronic device may adopt the preset display manner (for example, a color highlighting mode, a font bolding mode, etc.) to update and display the shooting progress bar.

In embodiments of the present disclosure, after the electronic device switches the duration tag displayed in the process of video shooting to the second duration tag, the duration of the entire process of video shooting will change, for example, increase (or decrease). Accordingly, the shooting progress bar on the shooting control in the first interface will also change, for example, become shorter (or longer).

In embodiments of the present disclosure, the electronic device may adjust a position of a progress tag on a shooting progress bar based on a proportional relationship between the second shooting duration and the first shooting duration. It can be understood that, the position of the progress tag on the shooting progress bar may change with the time for the video shooting.

Figure 6:
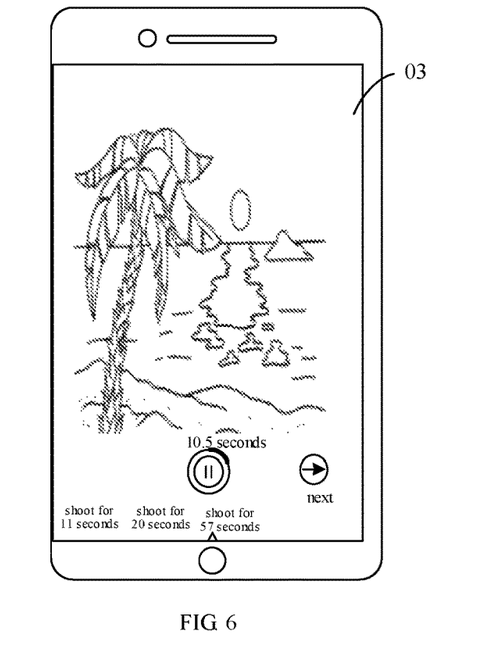
FIG. 6 is a schematic diagram of an interface of a mobile phone according to yet another exemplary embodiment.

Exemplarily, in combination with FIG. 5, as illustrated in FIG. 6, the user may select the second duration tag (for example, "shoot for 57 seconds") in the first interface 03, so that the mobile phone switches the duration tag displayed in the process of video shooting from the currently adopted default duration tag (for example, "shoot for 20 seconds") to the second duration tag (in the second duration tag, the shooting progress bar on the shooting control 02 becomes shorter). Therefore, the mobile phone continues perform the video shooting in the second shooting duration corresponding to the second duration tag. When the shooting duration of the mobile phone reaches 57 seconds, the mobile phone may terminate the video shooting, that is, the mobile phone completes shooting of a 57-second video.

In embodiments of the present disclosure, the user may also trigger the electronic device to terminate the video shooting first, and then trigger the electronic device to switch the duration tag (i.e., to perform the first operation). Exemplarily, before step S14, that is, before "the electronic device, in response to a first operation of the user on a second duration tag in the at least one duration tag, updates the maximum duration of the video shooting to a second shooting duration corresponding to the second duration tag", the method for shooting a video according to embodiments of the present disclosure further includes the following step S16.

At step S16, in the process of video shooting, the electronic device terminates the video shooting in response to a terminating instruction.

In embodiments of the present disclosure, the second operation may be configured to trigger the electronic device to terminate the video shooting, thus triggering the terminating instruction.

In embodiments of the present disclosure, the second operation may be a click operation of the user on the shooting control (that is, the shooting control in another display state) that is kept displayed.

It may be understood that the video is continuously shot with the maximum duration when another duration tag is selected after the terminating. For example, the user may perform the first operation after triggering the electronic device to be in a state of terminating the video shooting so as to trigger the electronic device to switch the duration tag displayed in the process of the video shooting to the second duration tag (that is, to update the maximum duration of the video shooting to the second shooting duration), and to continue the video shooting. In this case, the first operation is configured to trigger the electronic device to perform switching of duration tags and video shooting (which is an implementation here).

It should be noted that when the electronic device terminates the video shooting, an interface displayed is different from the shooting preview interface and the first interface, and the interface also includes at least one duration tag.

Figure 7:
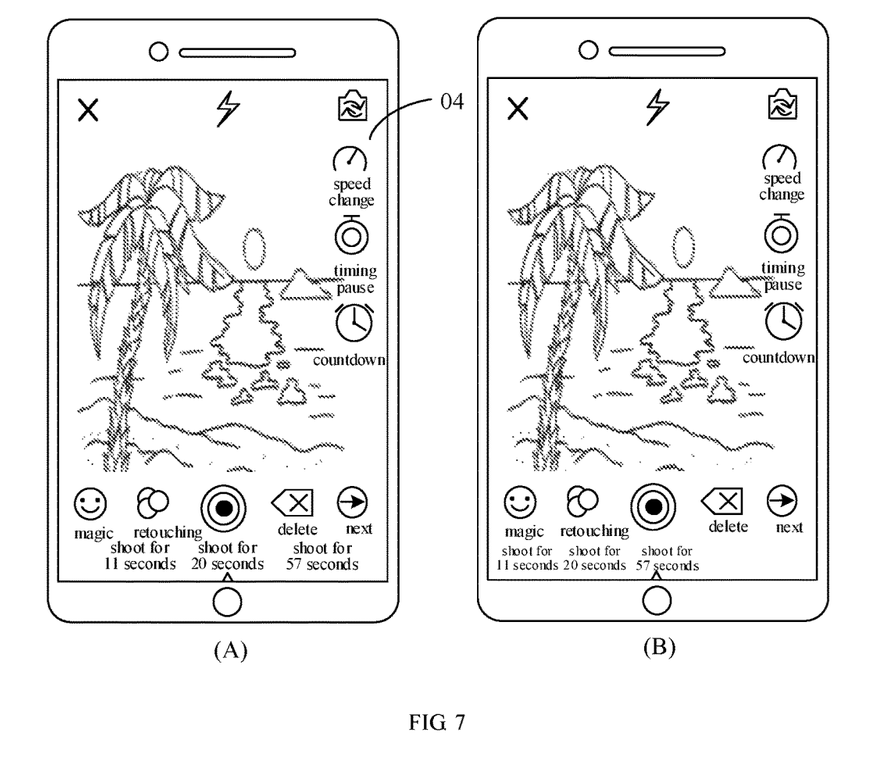
FIG. 7 is a schematic diagram of an interface of a mobile phone according to still yet another exemplary embodiment.

Exemplarily, in combination with FIG. 5, as illustrated in (A) in FIG. 7, the user may perform the second operation on the shooting control 02 in the first interface 03, such that the mobile phone terminates the video shooting and displays an interface 04. And then, as illustrated in (B) in FIG. 7, the user may select the second duration tag (for example, "shoot for 57 seconds") in the interface 04, so that the mobile phone switches the duration tag displayed in the process of video shooting from the default duration tag (for example "shoot for 20 seconds") to the second duration tag. The mobile phone continues to perform the video shooting within the second shooting duration corresponding to the second duration tag. When the shooting duration of the mobile phone reaches 57 seconds, the mobile phone may terminate the video shooting, that is, the phone finishes shooting a 57-second video.

In embodiments of the present disclosure, in another implementation, when the electronic device is in the state of terminating the video shooting, the user may perform the first operation first to trigger the electronic device to switch the duration tag displayed in the process of video shooting to the second duration tag, and then the user may continue the shooting operation to trigger the electronic device to continue the video shooting.

In embodiments of the present disclosure, the electronic device may detect the time progress of the video shooting in real time. When the electronic device detects that the duration of the video shooting has been currently performed is equal to the second shooting duration (that is, the time interval of the finished part of the video shooting (that is, the time interval of the video shooting has been currently performed) reaches the second shooting duration), the electronic device may terminate the video shooting.

In embodiments of the present disclosure, the electronic device may terminate the video shooting by turning off the video shooting function of the electronic device.

Embodiments of the present disclosure provide a method for shooting a video. In a case where the shooting preview interface is displayed, the electronic device may determine the first duration tag from the at least one duration tag, and in response to the shooting operation of the user, sets the maximum duration of the video shooting to the first shooting duration corresponding to the first duration tag, and keeps displaying the at least one duration tag. Consequently, in response to the first operation of the user on the second duration tag, the electronic device updates the maximum duration of the video shooting to the second shooting duration corresponding to the second duration tag. After the user performs the shooting operation, the electronic device may keep displaying the at least one duration tag so that the user may select a duration tag (for example, the second duration tag) based on practical requirements, that is, after the electronic device starts to shoot a video, the user may still select the desired duration tag. Consequently, the electronic device updates the maximum duration of the video shooting to a shooting duration corresponding to a duration tag selected by the user, that is, the electronic device may, based on selections of the duration tag of the user, perform video shooting of different durations, thereby improving the flexibility of the electronic device for video shooting.

In embodiments of the present disclosure, the electronic device may switch the duration tag displayed in the process of video shooting from a longer duration tag to a shorter duration tag (for example, from the above "shoot for 57 seconds" to "shoot for 20 seconds"), or from the shorter duration tag to the longer duration tag (for example, from the above "shoot for 20 seconds" to "shoot for 57 seconds"). The shooting duration corresponding to the longer duration tag is longer than the shooting duration corresponding to the shorter duration tag.

Figure 8:
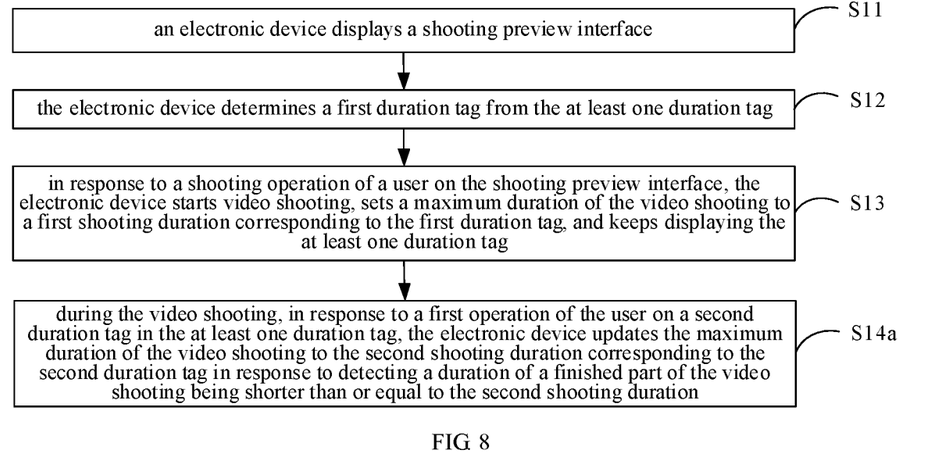
FIG. 8 is a flowchart of a method for shooting a video according to another exemplary embodiment.

In embodiments of the present disclosure, when the electronic device switches the duration tag displayed in the process of video shooting from the longer duration tag to the shorter duration tag, with reference to FIG. 3 and as illustrated in FIG. 8, step S14 may be implemented through the following step S14a.

At step S14a, during the video shooting, in response to a first operation of the user on a second duration tag in the at least one duration tag, the electronic device updates the maximum duration of the video shooting to the second shooting duration corresponding to the second duration tag in response to detecting a time interval of a finished part of the video shooting being shorter than or equal to the second shooting duration.

In embodiments of the present disclosure, the electronic device may detect the time progress of the video shooting in real time to determine whether the time interval of the finished part of the video shooting (that is, the time interval of the video which has been currently shot) exceeds the second shooting duration. When the time interval of the finished part of the video shooting does not exceed the second shooting duration, the electronic device switches the duration tag displayed in the process of video shooting to the second duration tag to update the maximum duration of the video shooting to the second shooting duration corresponding to the second duration tag. Therefore, the electronic device performs the video shooting in the second shooting duration corresponding to the second duration tag.

In embodiments of the present disclosure, step S14a may be replaced with the following step S14b.

At step S14b, during the video shooting, in response to the first operation of the user on the second duration tag in the at least one duration tag, the electronic device adjusts an operation authority for the second duration tag to prohibit an operation of the user on the second duration tag in response to detecting the time interval of the finished part of the video shooting being longer than the second shooting duration.

It can be understood that, a duration tag is forbidden to be selected from the duration tags in response to that the time interval is greater than a duration corresponding to the duration tag.

It may be understood that in a case that the time interval of the finished part of the video shooting is longer than the second shooting duration, the electronic device may not need to switch the duration tag, but continue to perform the video shooting with the shooting duration corresponding to the currently adopted duration tag, and modify the operation authority for the second duration tag, so that the user cannot operate on the second duration tag.

In embodiments of the present disclosure, the electronic device may modify the operation authority for the second duration tag of the user by modifying the content of configuration files corresponding to the second duration tag.

In embodiments of the present disclosure, the electronic device may detect the time interval of the finished part of the video shooting in real time to determine whether to switch the duration tag displayed in the process of video shooting to the duration tag selected by the user, thereby improving the accuracy and flexibility of the video shooting.

In embodiments of the present disclosure, after step S14, the method for shooting a video according to embodiments of the present disclosure further includes the following step S17.

At step S17, during the video shooting, the electronic device updates a duration tag in the at least one duration tag having a shooting duration shorter than or equal to a time interval of a finished part of the video shooting to display the duration tag having the shooting duration shorter than or equal to the time interval of the finished part of the video shooting in a preset display effect.

According to embodiments of the present disclosure, if it is detected that the time interval of the finished part of the video shooting is equal to a shooting duration corresponding to one duration tag in the at least one duration tag in a process of performing the video shooting in the second shooting duration, the electronic device may update the one duration tag to display the one duration tag in the preset display effect; and/or, if it is detected that the time interval of the finished part of the video shooting is longer than a shooting duration (or shooting durations) corresponding to another duration tag (or a plurality of duration tags) in the at least one duration tag, the electronic device may update the another duration tag (or the plurality of duration tags) to display the another duration tag (or the plurality of duration tags) in the preset display effect.

In embodiments of the present disclosure, in a case where the electronic device updates a duration tag in the at least one duration tag having a shooting duration shorter than or equal to the time interval of the finished part of the video shooting to display the duration tag having the shooting duration shorter than or equal to the time interval of the finished part of the video shooting in the preset display effect, the electronic device may adjust the operation authority for the duration tag to prohibit an operation of the user on the duration tag, that is, during this shooting process, the electronic device cannot perform the video shooting in the shooting duration mode corresponding to the duration tag.

In other words, the method for shooting the video may include displaying a duration tag in a first display effect in response to that the time interval is smaller than or equal to than a duration corresponding to the duration tag; and displaying a duration tag in a second display effect in response to that the time interval is greater than a duration corresponding to the duration tag. The first display effect may be different from the second display effect.

In embodiments of the present disclosure, the preset display effect may include at least one of: a gray display effect, a mark-added display effect, and a recolor display effect. The specific preset display effect may be determined based on practical requirements, which is not limited herein.

According to embodiments of the present disclosure, during the process of performing the video shooting within the second shooting duration, the electronic device may detect the time progress of the video shooting in real time to determine any duration tag that is unavailable during the process, thereby displaying the duration tag in the preset display effect. In this manner, the user may be informed that the duration tag is no longer available in an effective and timely manner.

The present disclosure also provides an apparatus for shooting a video, which may include one or more processors, a memory coupled to the one or more processors, and a plurality of instructions stored in the memory. When the instructions are executed by the one or more processors, the one or more processors are cause to perform the method for shooting a video as described above.

Figure 9:
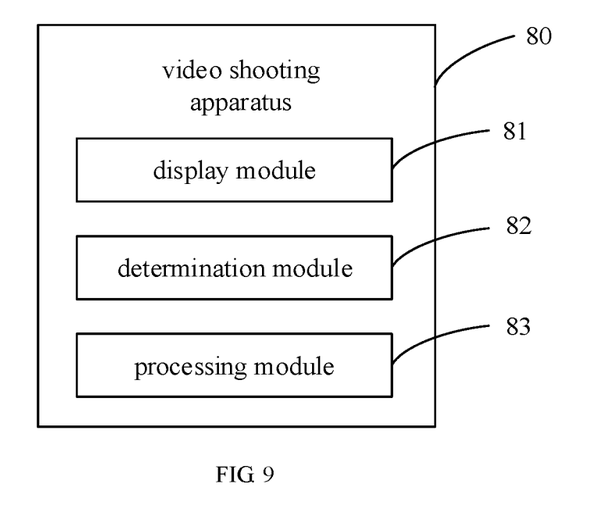
FIG. 9 is a block diagram of an apparatus for shooting a video according to an exemplary embodiment.

FIG. 9 is a block diagram of an apparatus for shooting a video according to an exemplary embodiment. As illustrated in FIG. 9, the apparatus includes a display module 81, a determination module 82 and a processing module 83.

The display module 81 is configured to display a shooting preview interface. The shooting preview interface includes at least one duration tag, and one duration tag corresponds to one shooting duration. The determination module 82 is configured to determine a first duration tag from the at least one duration tag. The processing module 83 is configured to, in response to a shooting operation of a user on the shooting preview interface, start video shooting, set a maximum duration of the video shooting to a first shooting duration corresponding to the first duration tag, and keep displaying the at least one duration tag, and to, during the video shooting, in response to a first operation of the user on a second duration tag in the at least one duration tag, update the maximum duration of the video shooting to a second shooting duration corresponding to the second duration tag.

In embodiments of the present disclosure, the processing module 83 is configured to, before updating the maximum duration of the video shooting to the second shooting duration corresponding to the second duration tag in response to the first operation of the user on the second duration tag in the at least one duration tag, terminate the video shooting in response to a second operation of the user.

In embodiments of the present disclosure, the processing module 83 is configured to, in response to detecting a time interval of a finished part of the video shooting being shorter than or equal to the second shooting duration, update the maximum duration of the video shooting to the second shooting duration corresponding to the second duration tag.

Figure 10:
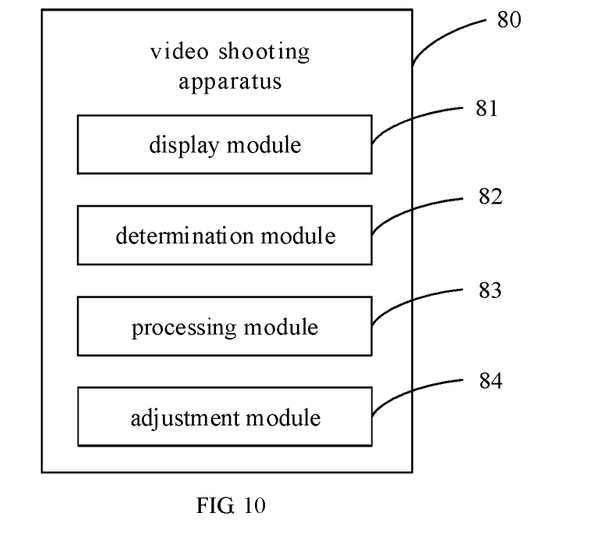
FIG. 10 is a block diagram of an apparatus for shooting a video according to another exemplary embodiment.

In embodiments of the present disclosure, with reference to FIG. 9 and as illustrated in FIG. 10, the apparatus 80 further includes an adjustment module 84. The adjustment module 84 is configured to, in response to detecting the time interval of the finished part of the video shooting being longer than the second shooting duration, adjust an operation authority for the second duration tag to prohibit an operation of the user on the second duration tag.

In embodiments of the present disclosure, the display module 81 is configured to, during the video shooting, update a duration tag in the at least one duration tag having a shooting duration shorter than or equal to a time interval of a finished part of the video shooting to display the duration tag having the shooting duration shorter than or equal to the time interval of the finished part of the video shooting in a preset display effect.

In embodiments of the present disclosure, the shooting preview interface includes a shooting progress bar configured to indicate a time progress of the video shooting. The processing module 83 is configured to adjust a size of the shooting progress bar based on a proportional relationship between the second shooting duration and the first shooting duration.

Regarding the apparatus for shooting a video according to the foregoing embodiments, the specific manners for performing operations of each module therein have been described in detail in the embodiments of the method for shooting a video, which will not be described in detail herein.

In summary, after the user performs the shooting operation, the at least one duration tag may be kept displayed so that the user may select a duration tag (for example, the second duration tag) based on practical requirements, that is, after starting to shoot a video, the user may still select the desired duration tag. Consequently, the maximum duration of the video shooting is updated to a shooting duration corresponding to a duration tag selected by the user, that is, video shooting of different durations may be performed based on selections of the duration tag of the user, thereby improving the flexibility of video shooting.

In addition, when the apparatus for shooting a video according to the foregoing embodiments realizes its functions, the division of the foregoing functional modules is only used for illustration. In practical applications, the functions may be allocated to be implemented by different functional modules as required, that is, an internal structure of the apparatus for shooting a video is divided into different functional modules to complete all or part of the functions described above.

Figure 11:
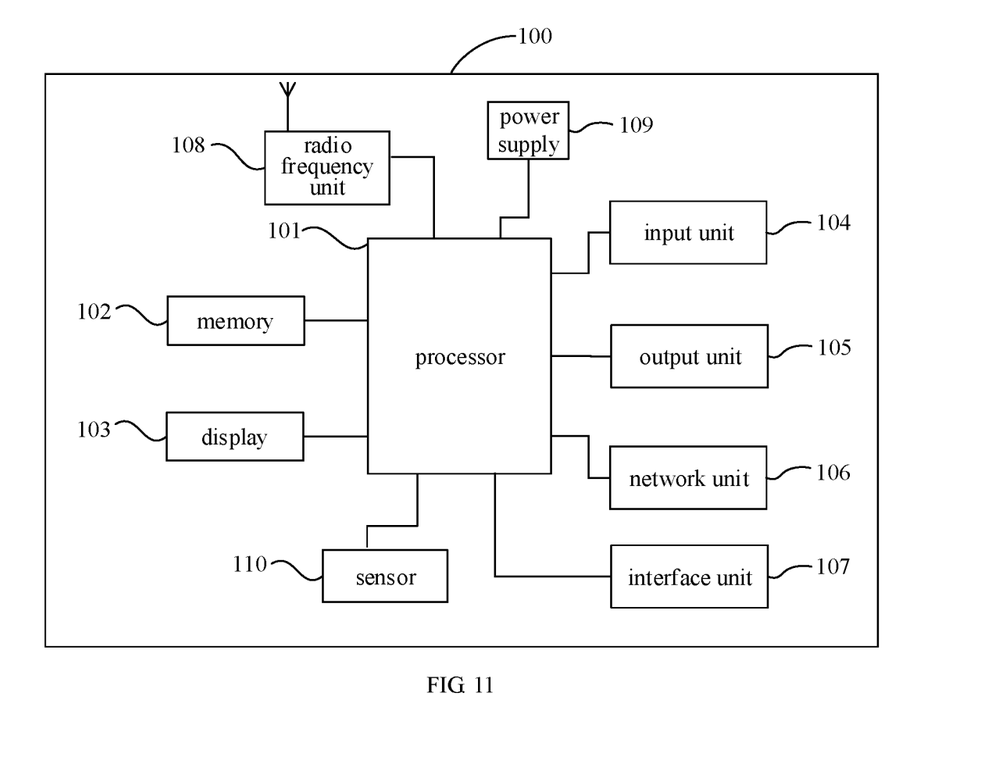
FIG. 11 is a schematic diagram of an electronic device according to an exemplary embodiment.

FIG. 11 is a schematic diagram of an electronic device according to an exemplary embodiment. An electronic device 100 includes, but is not limited to, a mobile phone, a tablet computer, a notebook computer, a palmtop computer, a vehicle-mounted terminal, a wearable device, a pedometer, and the like. As illustrated in FIG. 11, the electronic device 100 includes but is not limited to: a processor 101, a memory 102, a display 103, an input unit 104, an output unit 105, a network unit 106, an interface unit 107, a radio frequency unit 108, a power supply 109, and a sensor 110.

It should be noted that those skilled in the art may understand that the structure of the electronic device 100 illustrated in FIG. 11 does not constitute a limitation on the electronic device 100, and the electronic device 100 may include more or less components than those illustrated in FIG. 11, combine some components, or arrange the components in a different manner.

In embodiments of the present disclosure, the display 103 is configured to display the shooting preview interface. The shooting preview interface includes at least one duration tag, and one duration tag corresponds to one shooting duration.

The processor 101 is configured to: determine a first duration tag from the at least one duration tag; in response to a shooting operation of a user on the shooting preview interface, start video shooting, set a maximum duration of the video shooting to a first shooting duration corresponding to the first duration tag, and keep displaying the at least one duration tag; and during the video shooting, in response to a first operation of the user on a second duration tag in the at least one duration tag, update the maximum duration of the video shooting to a second shooting duration corresponding to the second duration tag.

It should be noted that the electronic device 100 may implement various processes implemented by the electronic device according to the above method embodiments, and may achieve the same technical effect. To avoid repetition, the detailed description will not be repeated here.

As the control center of the electronic device 100, the processor 101 uses various interfaces and lines to connect different parts of the entire electronic device 100, and executes various functions of the electronic device 100 and processes data by running or executing software programs and/or modules stored in the memory 102 and calling data stored in the memory 102, thereby monitoring the electronic device 100 as a whole. The processor 101 may include one or more processing units. In embodiments of the present disclosure, the processor 101 may integrate an application processor and a modem processor. The application processor mainly processes an operating system, a user interface, application programs, and so on. The modem processor mainly deals with wireless communication. It can be understood that the modem processor may not be integrated into the processor 101.

The memory 102 may be configured to store software programs and data. The memory 102 may mainly include a program storage area and a data storage area. The program storage area may store an operating system, an application program required by at least one function (such as a sound playback function, an image display function, etc.), and so on. The data storage area may store data (such as audio data, a phone book, etc.) created by the use of the mobile phone. In addition, the memory 102 may include a high-speed random access memory and a non-volatile memory, such as at least one magnetic disk storage device, a flash memory device, or other volatile solid-state storage devices.

The display 103 is configured to display information input by the user or information provided to the user. The display 103 may include a display panel that may be configured in the form of a liquid crystal display (LCD), an organic light-emitting diode (OLED), and the like.

The input unit 104 may be configured to receive audio or video signals. The input unit 104 may include a graphics processing unit (GPU) and a microphone. The graphics processing unit processes image data of still pictures or videos obtained by an image capture device (such as a camera) in a video capture mode or an image capture mode. A processed image frame may be displayed on the display 103. An image frame processed by the graphics processing unit may be stored in the memory 102 (or other storage media) or transmitted via the radio frequency unit 108 or the network unit 106. The microphone may receive sound and may process such sound into audio data. The processed audio data may be converted into a format that may be sent to a mobile communication base station via the radio frequency unit 108 for output in the case of a telephone call mode.

The input unit 104 may be a user input unit, which may be configured to receive inputted numeric or character information, and generate a key signal input related to user settings and function control of the electronic device 100. In detail, the user input unit includes a touch panel and other input devices. A touch panel, also known as a touch screen, may collect touch operations (for example, operations on or near the touch panel performed by the user with a finger, a stylus, or any other suitable objects or accessories) of the user on or near the touch panel. The touch panel may include two parts: a touch detection device and a touch controller. The touch detection device detects a position of a touch of the user, detects a signal brought by the touch operation, and transmits the signal to the touch controller. The touch controller receives touch information from the touch detection device, converts the touch information into contact coordinates, sends the contact coordinates to the processor 101, and receives and executes a command sent by the processor 101. In addition, the touch panel may be implemented as, for example, a resistive touch panel, a capacitive touch panel, an infrared touch panel, a surface acoustic wave touch panel and so on. In addition to the touch panel, the user input unit may also include other input devices. In detail, other input devices may include, but are not limited to, a physical keyboard, function keys (such as a volume control button, a switch button, etc.), a trackball, a mouse, and a joystick, which will not be repeated here.

Further, the touch panel may be covered on the display panel. When the touch panel detects a touch operation on or near it, the touch operation is transmitted to the processor 101 to determine the type of the touch event. And then, the processor 101 provides a corresponding visual output on the display panel based on the type of the touch event. The touch panel and the display panel 1061 may be used as two independent components to realize input and output functions of the electronic device 100, or the touch panel and the display panel may be integrated to realize the input and output functions of the electronic device 100. The present disclosure does not make any limit in this regard.

The output unit 105 may be an audio output unit, and may convert audio data received by the radio frequency unit 108 or the network unit 106 or stored in the memory 102 into audio signals and output the audio signals as sounds. Moreover, the audio output unit may also provide an audio output (for example, a call signal reception sound, a message reception sound, etc.) related to a specific function performed by the electronic device 100. The audio output unit includes a speaker, a buzzer, a receiver, and so on.

The electronic device 100 provides the user with wireless broadband Internet access through the network unit 106, such as helping the user to send and receive emails, browse web pages, and access streaming media.

The interface unit 107 is an interface for connecting an external device and the electronic device 100. For example, the external device may include a wired or wireless headset port, an external power source (or a battery charger) port, a wired or wireless data port, a memory card port, a port for connecting a device with a recognition module, an audio input/output (I/O) port, a video I/O port, a headphone port, etc. The interface unit 107 may be configured to receive an input (for example, data information, power, etc.) from an external device and to transmit the received input to one or more elements in the electronic device 100, or may be configured to transmit data between the electronic device 100 and the external device.

The radio frequency unit 108 may be configured to send and receive information, or to receive and send signals during a call. In detail, after downlink data from the base station is received, the downlink data is processed by the processor 101. In addition, uplink data is sent to the base station. Generally, the radio frequency unit 108 includes, but is not limited to, an antenna, at least one amplifier, a transceiver, a coupler, a low noise amplifier, a duplexer, and the like. In addition, the radio frequency unit 108 may also communicate with the network and other devices through a wireless communication system.

The power supply 109 (such as a battery) may be configured to supply power to various components. In embodiments of the present disclosure, the power supply 109 may be logically connected to the processor 101 through a power management system, so that functions such as charging, discharging, and power consumption management may be implemented through the power management system.

The sensor 110 may include at least one of a light sensor, a motion sensor, and other sensors. In detail, the light sensor includes an ambient light sensor and a proximity sensor. The ambient light sensor may adjust the brightness of the display panel according to the brightness of the ambient light. The proximity sensor may turn on or off the display panel and/or backlight when the electronic device 100 is moved to an ear. As a kind of motion sensor, an accelerometer sensor may detect the magnitude of acceleration in various (usually triaxial) directions, detect the magnitude and direction of gravity in a stationary state, may be configured to recognize a posture (such as horizontal and vertical screen switching, related games, magnetometer posture calibration) of the electronic device, and may be configured for vibration recognition-related functions (such as a pedometer, a tap), and so on. The sensor 110 may also include a fingerprint sensor, a pressure sensor, an iris sensor, a molecular sensor, a gyroscope, a barometer, a hygrometer, a thermometer, an infrared sensor, and so on. Detailed description is omitted here.

In addition, the electronic device 100 includes some functional modules (such as a camera) that are not illustrated. These functional modules are not described in detail herein.

In an exemplary embodiment, embodiments of the present disclosure further provide a storage medium including instructions, for example, the memory 102 including instructions. The instructions may be executed by the processor 101 of the electronic device 100 to implement the above method. In embodiments of the present disclosure, the storage medium may be a non-transitory computer-readable storage medium. For example, the non-transitory computer-readable storage medium may be a read-only memory (ROM) or a random access memory (RAM), a CD-ROM, a magnetic tape, a floppy disk and an optical data storage device.

In an exemplary embodiment, there is also provided a computer program product including one or more instructions. The one or more instructions may be executed by the processor 101 of the electronic device 100 to implement the foregoing method.

It should be noted that when the instructions in the storage medium or the one or more instructions in the computer program product are executed by the processor 101, each process of the foregoing method embodiments may be implemented, and the same technical effect may be achieved. For brevity, repeated description is omitted herein.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the attached claims.

What is claimed is:

1. A method for shooting a video, comprising:
displaying a shooting preview interface, wherein the shooting preview interface comprises a plurality of duration tags corresponding to different shooting durations;
shooting the video with a maximum duration based on a first duration tag selected from the plurality of duration tags;
updating the maximum duration based on a second duration tag in response to that a selected duration tag is changed to the second duration tag;
terminating shooting the video in response to a terminating instruction; and
continuing shooting the video with the maximum duration based on a third duration tag in response to that the selected duration tag is changed to the third duration tag after said terminating.

2. The method of claim 1, further comprising:
determining a time interval of a finished part of the video;
wherein said updating the maximum duration comprises:
updating the maximum duration in response to that the time interval is smaller than or equal to a duration corresponding to the second duration tag.

3. The method of claim 2, further comprising:
displaying a duration tag in a first display effect in response to that the time interval is smaller than or equal to than a duration corresponding to the duration tag; and
displaying a duration tag in a second display effect in response to that the time interval is greater than a duration corresponding to the duration tag;
wherein the first display effect is different from the second display effect.

4. The method of claim 2, further comprising:
forbidding selecting a duration tag from the plurality of duration tags in response to that the time interval is greater than a duration corresponding to the duration tag.

5. The method of claim 1, further comprising:
adjusting a size of a shooting progress bar based on a proportional relationship between the second shooting duration and the first shooting duration, wherein the shooting progress bar is displayed on the shooting preview interface and configured to indicate a progress of shooting the video.

6. The method of claim 1, further comprising:
adjusting a position of a progress tag on a shooting progress bar based on a proportional relationship between the second shooting duration and the first shooting duration.

7. An apparatus for shooting a video, comprising:
one or more processors;
a memory coupled to the one or more processors,
a plurality of instructions stored in the memory, when executed by the one or more processors, cause the one or more processors perform acts comprising:
displaying a shooting preview interface, wherein the shooting preview interface comprises a plurality of duration tags corresponding to different shooting durations;
shooting the video with a maximum duration based on a first duration tag selected from the plurality of duration tags;
updating the maximum duration based on a second duration tag in response to that a selected duration tag is changed to the second duration tag;
terminating shooting the video in response to a terminating instruction; and
continuing shooting the video with the maximum duration based on a third duration tag in response to that the selected duration tag is changed to the third duration tag after said terminating.

8. The apparatus of claim 7, wherein the one or more processors are further caused to perform an act of:
determining a time interval of a finished part of the video; and
wherein the one or more processors are caused to update the maximum duration by perform an act of:
updating the maximum duration in response to that the time interval is smaller than or equal to a duration corresponding to the second duration tag.

9. The apparatus of claim 8, wherein the one or more processors are further caused to perform acts of:
displaying a duration tag in a first display effect in response to that the time interval is smaller than or equal to than a duration corresponding to the duration tag; and
displaying a duration tag in a second display effect in response to that the time interval is greater than a duration corresponding to the duration tag;
wherein the first display effect is different from the second display effect.

10. The apparatus of claim 8, wherein the one or more processors are further caused to perform an act of:
forbidding selecting a duration tag from the plurality of duration tags in response to that the time interval is greater than a duration corresponding to the duration tag.

11. The apparatus of claim 7, wherein the one or more processors are further caused to perform an act of:
adjusting a size of a shooting progress bar based on a proportional relationship between the second shooting duration and the first shooting duration, wherein the shooting progress bar is displayed on the shooting preview interface and configured to indicate a progress of shooting the video.

12. The apparatus of claim 7, wherein the one or more processors are further caused to perform an act of:
adjusting a position of a progress tag on a shooting progress bar based on a proportional relationship between the second shooting duration and the first shooting duration.

13. A non-transitory computer-readable storage medium, wherein when an instruction stored therein is executed by a processor in an electronic device, the processor is caused to perform acts comprising:
displaying a shooting preview interface, wherein the shooting preview interface comprises a plurality of duration tags corresponding to different shooting durations;
shooting the video with a maximum duration based on a first duration tag selected from the plurality of duration tags; and
updating the maximum duration based on a second duration tag in response to that a selected duration tag is changed to the second duration tag;
terminating shooting the video in response to a terminating instruction; and
continuing shooting the video with the maximum duration based on a third duration tag in response to that the selected duration tag is changed to the third duration tag after said terminating.

14. The non-transitory computer-readable storage medium of claim 13, wherein the processor is further caused to perform an act of:
determining a time interval of a finished part of the video;
wherein the processor is caused to update the maximum duration by perform an act of:
updating the maximum duration in response to that the time interval is smaller than or equal to a duration corresponding to the second duration tag.

* * * * *